United States Patent

[11] 3,612,625

| [72] | Inventor | Walter E. Huber<br>Springfield, Mo. |
|---|---|---|
| [21] | Appl. No. | 861,377 |
| [22] | Filed | Sept. 26, 1969 |
| [45] | Patented | Oct. 12, 1971 |
| [73] | Assignee | Dayco Corporation<br>Dayton, Ohio |

[54] TRACK FOR SNOW VEHICLES
5 Claims, 7 Drawing Figs.

[52] U.S. Cl. ............................................. 305/35 EB,
                                                    305/38
[51] Int. Cl. .................................................. B62d 55/24
[50] Field of Search ........................................ 305/36, 37,
                                    38, 35 EB; 198/193; 74/237

[56] References Cited
UNITED STATES PATENTS

| 2,899,242 | 8/1959 | Bombardier.................. | 305/38 |
| 3,451,729 | 6/1969 | Roy ............................... | 305/38 |
| 3,464,743 | 9/1969 | Hallaman ...................... | 305/35 (EB) |
| 3,477,767 | 11/1969 | McNeil........................... | 305/38 |

*Primary Examiner*—Richard J. Johnson
*Attorney*—Rueben Wolk

ABSTRACT: A track for snow vehicles formed of a flat band of elastomeric material, in which the outer ground-engaging surface has at least one pair of parallel ribs extending longitudinally of the track and outwardly of the surface to prevent lateral slip. Spaced sprocket holes extend through the track between the ribs.

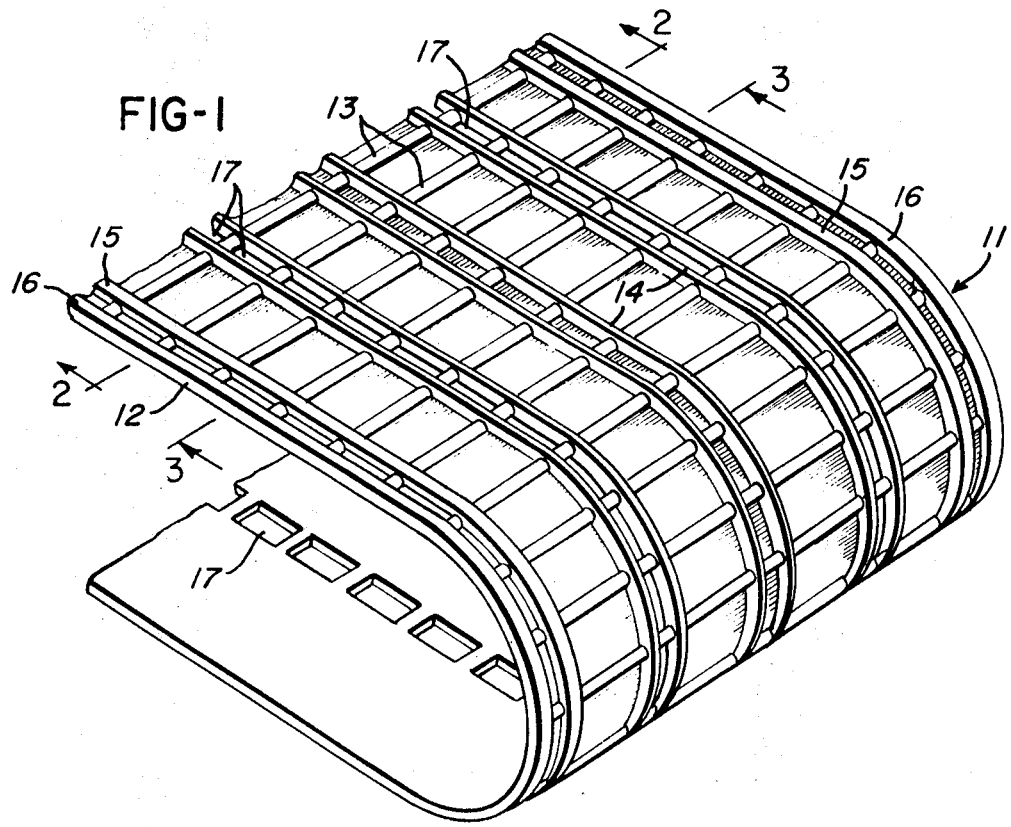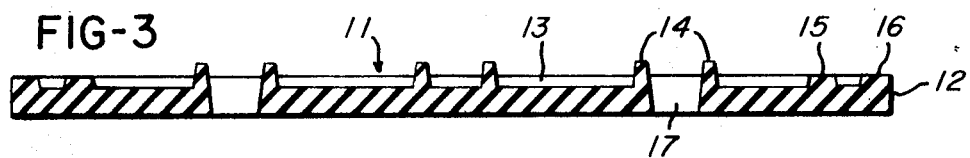

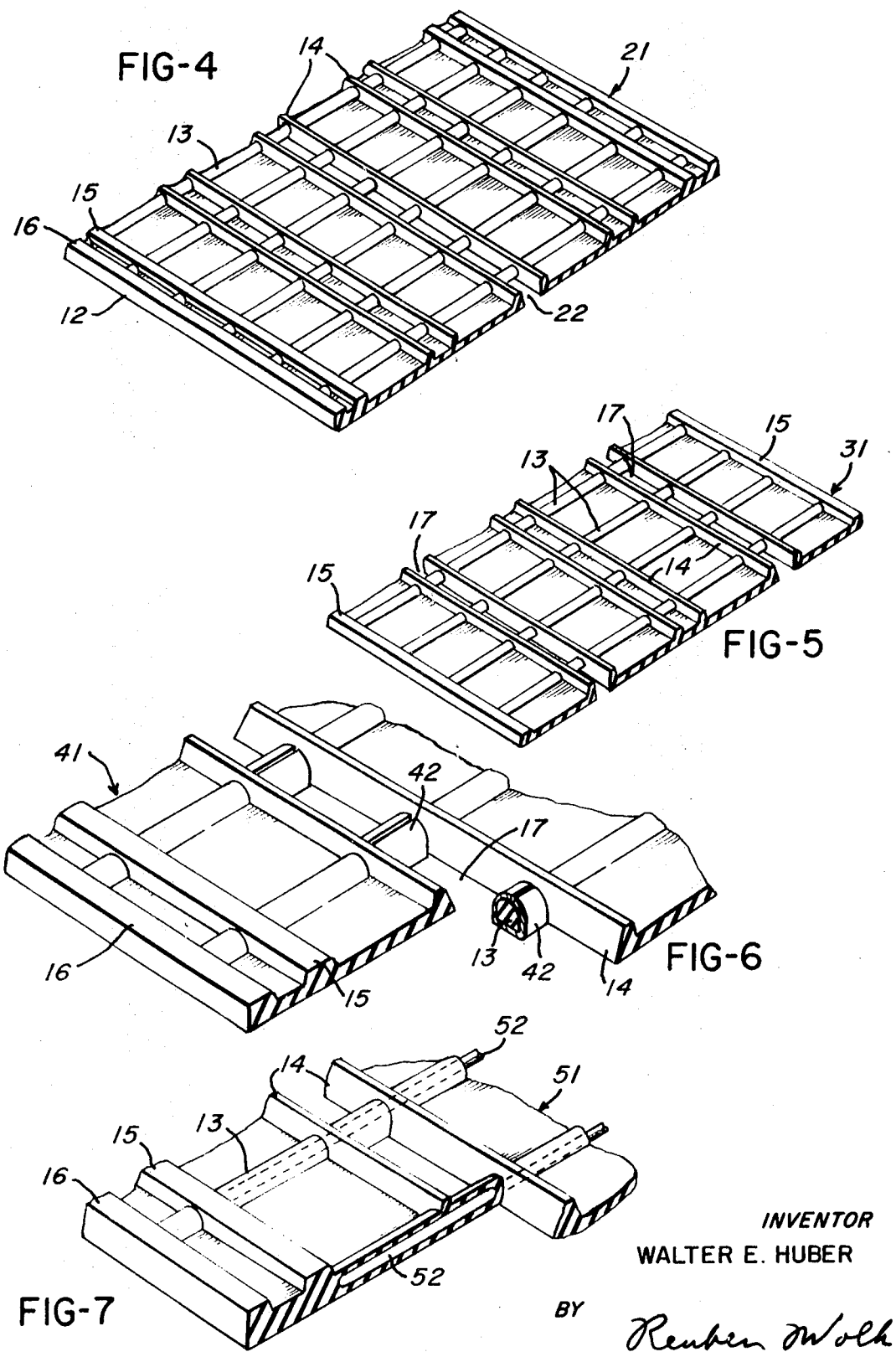

TRACK FOR SNOW VEHICLES

BACKGROUND OF THE INVENTION

The invention relates to an endless track for power driven vehicles, particularly snow vehicles more commonly known as "snowmobiles." The track is conventionally formed of a flat band of elastomeric material such as rubber or urethane, formed into an endless member. This track is placed around a series of sprocket wheels which drive the track by means of the sprockets that are inserted through openings in the track. Typical of tracks of this type are those illustrated in U.S. Pat. No. 2,899,242, issued to Bombardier, and U.S. Pat. No. 3,451,729, issued to Roy.

The track operates by force of the sprockets against the holes in the track, the sprocket wheels engaging the inner surface of the track, and the outer surface of the track engaging the ground and providing the necessary friction for propulsion of the vehicle.

SUMMARY OF THE INVENTION

The present device provides a considerable improvement over the prior art tracks. First of all, the present track is provided with a number of pairs of parallel longitudinal ribs which extend completely around the track, these ribs extending outwardly from the principal portion of the track and thereby minimizing side slipping. This is highly important because it has been found that tracks of the type previously known have a tendency toward side or lateral slippage. In both of the prior art devices referred to above there is an attempt to provide longitudinal members, but is has been found that that these are not satisfactory because they do not extend outwardly of the principal portion of the track.

A further advantage of the present device is found in the face that it can be extremely versatile. For example, existing snow vehicles may either be driven by a single central sprocket, by two sprockets located equidistant from the center, or by three sprockets. According to the present device, the track may be originally fabricated in such a manner that it is simple to punch out sprocket holes for either the single, double, or triple sprocket drives as will be more fully described below.

The third feature of the present track is found in the manner in which it is fabricated; namely, an additional rib is provided at the outer edges which may be retained in the final track, or cut off if a narrow track is desired. This permits the basic track as originally fabricated to accommodate vehicles of different widths.

A final feature of the present track is found in the optional use of metal reinforcing rods which may be embedded in the transverse thickened sections. Thus, these sections may be fabricated either with or without these rods depending on the conditions of use.

BRIEF DESCRIPTION OF THE DRAWINGS

FIG. 1 is a perspective view of a portion of the novel track, illustrating both the inner sprocket-engaging surface and the outer ground-engaging surface and having two sets of sprocket-engaging holes.

FIGS. 2 and 3 are sections taken along lines 2—2 and 3—3 of FIG. 1.

FIG. 4 is a perspective view illustrating a segment of a similar track having a single series of sprocket-engaging holes.

FIG. 5 is a perspective view illustrating a segment of a track similar to FIg. 1, except with the edges removed to form a narrow track.

FIG. 6 is a fragmentary perspective view illustrating a further modification of the FIG. 1 track illustrating the use of wear clips.

FIG. 7 is a fragmentary perspective view illustrating a further form of the invention utilizing transverse reinforcing rods.

DESCRIPTION OF THE PREFERRED EMBODIMENTS

Referring to the drawings, the track 11 consists of a flat band 12 of elastomeric material such as rubber or urethane. The inner surface of the band is smooth except for the sprocket-engaging holes 17, while the outer surface consists of thickened transverse sections 13 which extend completely across the width of the track into the outermost ribs 16. These ribs 16 extend longitudinally of track and form the outermost edges and lie in the same plane as the transverse sections 13. Immediately inward of the ribs 16 are longitudinal ribs 15 which also extend throughout the length of the track and are in the same plane as the ribs 16 and thickened sections 13. Intermediate of the edges of the track are three pairs of longitudinally extending ribs 14 which extend outwardly of the thickened sections 13 and the ribs 15 and 16. Except for the ribs and the thickened portions, the outer surface of the band has a reduced thickness, which in effect forms flat sections. As shown in FIG. 1 the flat sections between the two outermost pairs of ribs 14 have been cut out to form sprocket-engaging openings 17. When placed on a snow vehicle, therefore, the sprockets will extend outwardly through these openings 17 to drive the track, while the ribs 14 tend to prevent lateral slippage.

FIGS. 2 and 3 further illustrate the relationship of the members described above.

FIG. 4 illustrates a modified form of track 21 having openings 22 that are located in the center of the track between the central pair of ribs 14 rather than the outer sets of ribs as previously described. This permits the track to be driven by a single sprocket in the center of the vehicle.

FIG. 5 illustrates a further form of a track 31 in which the outermost ribs 16 and adjacent portions have been cut away so that the outermost edges of the track are now defined by ribs 15. This results in a narrower track which fits a different vehicle.

The track 41 of FIG. 6 is identical to the track of FIg. 1, except that wear clips 42 have been secured around the transverse thickened sections 13 which are located between the ribs 14. These wear clips are made of a metal such as spring steel in order to minimize the wear of the sections 13 where they are contacted by the sprocket wheels.

A further form of the track is illustrated in FIG. 7 in which track 51 is similar to the track 11, except that reinforcing rods 51 are inserted within the interior of the thickened lateral sections 13. These rods provide additional reinforcement for the track.

It is understood that any of the above modifications, such as the use of wear clips or reinforcing rods, may be utilized with any of the tracks illustrated in FIGS. 1—5. It is also contemplated that the term "endless track" may refer to a track which has been fabricated in a single piece or one which has been fabricated as a discontinuous longitudinal member, the ends of which may be secured by a belt connector.

What is claimed is:

1. An endless track for snow vehicles and the like, comprising a flat band of elastomeric material, said band having an inner sprocket-engaging surface and an outer ground-engaging surface, said outer surface having a plurality of transversely extending thickened sections and at least one pair of parallel continuous longitudinally extending ribs projecting outwardly of the rest of the outer surface, and spaced sprocket tooth openings defined by said ribs and said thickened sections extending through said band, each outer lateral edge of said band defined by a pair of ribs that do not extend as far outwardly from said outer surface as said first ribs.

2. The track of claim 1 in which one pair of longitudinally extending ribs is centrally located from the sides of said track.

3. The track of claim 1 in which two pairs of longitudinally extending ribs are equidistantly located from the sides of said track.

4. The track of claim 1, including reinforcing rods embedded in said thickened sections.

5. The track of claim 1, including wear clips around said thickened sections.